Patented Aug. 22, 1944

2,356,297

UNITED STATES PATENT OFFICE 2,356,297

ALUMINUM SILICATE PIGMENTS AND PROCESS FOR PREPARING THEM

Ladislaus Balassa, Flint, Mich., assignor to E. I. du Pont de Nemours & Company, Wilmington, Del., a corporation of Delaware No Drawing. Application July 12, 1940, Serial No. 345,181

2 Claims. (Cl. 106—253)

This invention relates to dehydrated aluminum silicate pigments and more particularly to a method of closely controlled calcination and dehydration of aluminum silicates.

Natural hydrous aluminum silicate pigments of the type of kaolin or china clay and pyrophyllite or pencil stone have been used in the past in coating compositions. They are considered unsatisfactory as pigments in most vehicles since they are not readily wetted by organic binders of the oleo-resinous or synthetic resin types. They are also wetted poorly by organic liquids that are commonly used as solvents or thinners for binders of this type. A disadvantage, especially that of the kaolin pigments, is that due to their hydrophillic nature they permit the passage of moisture through the paint films, causing early failure by moisture, peeling, and blistering. Another disadvantage, specifically that of the pyrophyllites, is that as heretofore prepared, they were coarse and very difficult to grind sufficiently to form a smooth film without grit.

I have found, however, that when natural aluminum silicates of certain types are calcined at a specific temperature or within a specific temperature range, the above disadvantages are either overcome entirely or greatly reduced so that they are entirely satisfactory as pigments.

This invention has as an object to provide a method of treating inexpensive natural hydrous aluminum silicates to make them more suitable for use as pigments in oleo-resinous or synthetic resin vehicles.

It is also an object of this invention to prepare aluminum silicate pigments which will yield films of increased strength and hardness.

A further object is to prepare dehydrated aluminum silicate pigments which when incorporated in paint films, offer a greater resistance against the penetration of moisture through the films than is the case with the natural hydrous products.

A still further object is to prepare aluminum silicate pigments with improved wetting properties to organic liquids.

Other objects will appear as the description of the invention proceeds.

These objects are accomplished by heating pyrophyllite under certain conditions to a temperature between 600° C. to 1400° C., depending upon the properties required and the particular product treated. The invention will be more apparent from the examples given below by way of illustration.

I have found that a hydrated aluminum silicate of the pyrophyllite type is particularly suitable for treatment according to my invention. While the invention relates particularly to pyrophyllite, other hydrated aluminum silicates may be used where the quality requirements are not as high. These are represented by kaolin and clays to which the following formulas are usually assigned:

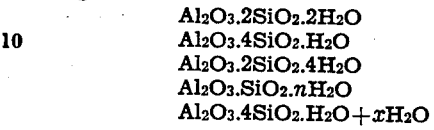

$Al_2O_3.2SiO_2.2H_2O$
$Al_2O_3.4SiO_2.H_2O$
$Al_2O_3.2SiO_2.4H_2O$
$Al_2O_3.SiO_2.nH_2O$
$Al_2O_3.4SiO_2.H_2O+xH_2O$

These naturally occurring hydrated silicates contain varied amounts of water of crystallization and composition and this water is lost in part or completely during calcination.

Due to comparatively wide variations in the physical properties and chemical composition of suitable aluminum silicates as well as the origin and the impurities which they may contain, it is impossible to set inflexible limitations with respect to time-temperature schedules which will result in a pigment having the exact characteristics desired. However, these will be apparent from the following description.

I have found that a temperature of 500° C. is necessary to effect a desirable change in kaolin while, to obtain a similar change in pyrophyllite, a temperature of 800° C. is necessary. These temperatures, however, may be increased to between 1000° C. and 1200° C. in order to bring about the change more rapidly. If desired, they may be heated as high as 1400° C. for a short time, with the result that pigments having most of the above enumerated properties will be obtained, but when such high temperatures are used, difficulty is encountered with respect to sintering, fusing and vitrifying. Therefore, the preferred temperature range lies between 600° C. and 1000° C. and of this range the lower temperatures are more practical since they do not require such close supervision.

The calcination of the raw aluminum silicate may be carried out in conventional kilns which may be of the stationary or rotary type. It is to be understood, however, that in making pigments of this type, contamination by smoke from a coal or oil fire is to be avoided. The following example illustrates a suitable procedure with respect to time and temperature for kaolin:

EXAMPLE I

A rotary calciner is preheated to about 800° C., after which it is loaded with kaolin. The temperature then drops, due to the introduction of the cold charge. Heating is continued until the temperature has returned to about 800° C. This temperature is maintained for about one hour while the calciner is being rotated, after which the aluminum silicate has been dehydrated to the degree necessary for making a pigment. It is then discharged and subjected to grinding and other treatment such as is customary in preparation of pigments.

The following example illustrates the treatment of pyrophyllite:

EXAMPLE II

A rotary calciner is heated to about 900° C. A charge of pyrophyllite is introduced in the usual way into the calciner and heating is continued until the temperature again rises to 900° C. This temperature is maintained for one hour during which the calciner is rotated and after which it is discharged. The pigment is treated in the conventional manner of preparing pigments for incorporation in the vehicle.

The above calcinations resulted in a simultaneous dehydration and break-down of the particles of the hydrated aluminum silicates which is indicated by the fact that the kaolin has increased in oil absorption from 85.5 cc. to 105.0 cc. while the pyrophyllite increased from 67.0 cc. to 88.5 cc. These figures are based on the Gardner-Coleman oil absorption test.

Pigments having an oil absorption lower than the raw aluminum silicates may be obtained by prolonged calcination at higher temperature. A charge of kaolin calcined for seven hours at around 1300° C. decreased in oil absorption from 85.5 cc. to 40.0 cc., the loss in oil absorption being due to the growth in crystal size at the high temperature.

I found that, for tough and elastic films, aluminum silicates should be calcined between 600° C. and 1000° C. while temperatures around 1200° C. or over should be used if coarse crystalline, hard, abrasive pigment is desired.

Impurities, especially iron silicate or hydrated iron oxides that frequently occur in combination with aluminum silicates, if present during the calcination, cause the calcined pigment to discolor and take on a brown or red color. Such impurities also increase the opacity of the calcined pigments very substantially.

In the above description of the first phase of my invention, I have illustrated how hydrated aluminum silicates may be converted into pigments which produce high-grade paints at low cost. Paints so produced show considerably improved resistance against abrasion, chipping, and moisture penetration and in addition have a more rapid drying rate. It will be apparent from the following examples that the compositions have a comparatively low pigment-binder ratio. They have unusual strength and if properly dried or baked, do not "lift" when subsequent lacquers and enamels are applied.

The vehicles suitable for pigmentation with calcined aluminum silicates may be those of the drying oil type with or without natural or synthetic resins. The pigment combination, however, should for best results contain calcined aluminum silicate as above prepared in excess of 50% of the total pigment combination. The ratio of pigment to binder should be adjusted to yield the most satisfactory compromise between maximum speed of dry, flexibility and film toughness. This adjustment will be controlled by the purpose for which the composition is to be used.

The following examples of typical compositions are included by way of illustration and not as a limitation:

EXAMPLE III

Gray primer-surfacer

| | Parts by weight |
|---|---|
| Resin A solution | 26.20 |
| Calcined pyrophyllite | 40.10 |
| Titanium dioxide | 10.36 |
| High solvency petroleum naphtha | 22.94 |
| Lead naphthenate solution (16% Pb) | .20 |
| Manganese naphthenate solution (3% Mn) | .20 |
| | 100.00 |

EXAMPLE IV

Gray primer-surfacer

| | Parts by weight |
|---|---|
| Resin A solution | 20.9 |
| Zinc oxide | 5.4 |
| Calcined pyrophyllite | 28.7 |
| Lithopone | 19.5 |
| High solvency petroleum naphtha | 25.1 |
| Lead naphthenate solution (16% Pb) | .2 |
| Manganese naphthenate solution (3% Mn) | .2 |
| | 100.0 |

EXAMPLE V

Oxide primer-surfacer

| | Parts by weight |
|---|---|
| Resin A solution | 24.8 |
| Calcined pyrophyllite | 31.3 |
| Calcium silicate | 4.7 |
| Barytes | 14.5 |
| Iron oxide | 12.8 |
| High solvency petroleum naphtha | 11.5 |
| Lead naphthenate solution (16% Pb) | .2 |
| Manganese naphthenate solution (3% Mn) | .2 |
| | 100.0 |

The calcined pyrophyllite used in Examples III, IV, and V was obtained by treating pyrophyllite in accordance with Example II.

Resin A solution used in Examples III, IV, and V was formed from the following ingredients, using the proportions indicated:

| | Parts by weight |
|---|---|
| Phthalic anhydride | 19.99 |
| Glycerol | 8.72 |
| Litharge | .03 |
| Linseed oil | 28.74 |
| High solvency petroleum naphtha | 42.52 |
| | 100.0 |

EXAMPLE VI

Dipping primer

| | Parts by weight |
|---|---|
| Varnish A | 45.6 |
| Iron naphthenate solution (6% Fe) | .5 |
| Calcined kaolin | 37.0 |
| Lamp black | 9.3 |
| Oleum spirits | 7.6 |
| | 100.0 |

The calcined kaolin used in the above composition was obtained by calcining kaolin clay according to Example I.

Varnish "A" was formed from the following ingredients, using the proportions indicated:

| | Parts by weight |
|---|---|
| Rosin | 14.98 |
| Calcium hydrate | .60 |
| Tung oil | 35.21 |
| Mineral spirits | 49.21 |
| | 100.00 |

The coating compositions set forth above, as well as other coating compositions falling within the scope of the present invention, are prepared by grinding or dispersing the pigment combinations with the resin or varnish in the presence of sufficient solvent to provide a consistency suited to the dispersing device used. After dispersion, the paint is reduced to application consistency with additional solvent. The naphthenate driers may be added at any desired point in the preparation of the coating composition.

Where desired, extenders or prime pigments, such as blanc fixe, silica, asbestine, whiting, lead chromate, zinc chromate, white lead, etc., may be incorporated in the coating composition falling within the scope of the present invention.

The use of zinc oxides, litharge, red lead or other basic pigments in combination with calcined aluminum silicate falls within the scope of this invention.

Resin A, the oil modified polyhydric alcohol-polybasic acid resin or resins of this general type, may be made in any well-known manner as, for example, by heating the ingredients at any suitable temperature above the melting point of the materials until resimplification is complete. If desired, refluxing or partial refluxing may be resorted to or the operation may be carried out at elevated or reduced pressures.

In general, it is advisable to maintain the acid number of the resin at the lowest possible value and this is usually accomplished by increasing the temperature or the period of heating, but stopping before the gel point is reached. The allowable range of acid numbers will vary with the type of pigment used. With chemically active pigments, like zinc oxide or basic carbonate white lead, the acid number should preferably be below 20. With chemically inert pigments, the question of acid number is not as important.

Varnish "A" referred to above, or other oleoresinous vehicles of the same type, may be made by any manner known to the art; for example, by heating the ingredients at any suitable temperature above the melting point of the ingredients until a homogeneous product of the desired dry and physical properties is obtained.

The term "resin" is used herein to include a natural resin, like rosin, congo, East India, damar, etc., or a synthetic or semi-synthetic resinous product like Bakelite, indene, amberol chlorinated rubber, cellulose esters and ethers, etc. The term "oil" includes drying oils, semi-drying oils, synthetic drying oils and plasticizers of an oily nature.

By the term "modified polyhydric-alcohol polybasic-acid resin" as used herein, I mean the resinous condensation product resulting from the reaction of one or more polyhydric alcohols and one or more polybasic acids with one or more of the following modifying ingredients: drying oils, semi-drying oils, synthetic drying oils and monobasic acids, especially those derived from drying oils and semi-drying oils and mixtures of one or more of these modifying ingredients with natural or synthetic resins or other equivalent products.

The term "calcined aluminum silicate" is used herein to include the group of compounds having as their main component alumina and silica chemically combined and with or without water of composition and water of crystallization. These compounds are obtained from minerals or clays occurring naturally as kaolin or china clay, ball clay, etc. The above aluminum silicates which contain varying amounts of water of composition or water of crystallization are calcined at or above a temperature which is sufficient to drive out part or all of the water of composition and the water of crystallization but not high enough to fuse or vitrify the aluminum silicates. I found that calcination temperatures between 600° C. and 1000° C. produce compounds with the optimum properties; however, aluminum silicates calcined at any temperature sufficient to cause loss of combined water is useful in this invention. Of all the aluminum silicates, pyrophyllite is more suitable than the others and represents one of the preferred embodiments of the invention.

The advantages which flow from the use of the herein described pigments are that they are more easily wetted by organic liquids usually used in paints; they also have increased drying potential and offer greater resistance against the penetration of moisture.

It is apparent that many widely different embodiments of this invention may be made without departing from the spirit and scope thereof, and therefore, it is not intended to be limited except as indicated in the appended claims.

I claim:

1. A coating composition comprising (A) a film forming vehicle comprising material selected from the group consisting of oils having drying properties and resins modified with such oil, and (B) a pigment, at least 50% of the said pigment being pyrophyllite calcined at a temperature between about 800° C. and 1100° C.

2. The composition of claim 1 in which the calcined prophyllite has been heated to about 900° C. for about 1 hour.

LADISLAUS BALASSA.